United States Patent Office 3,433,589
Patented Mar. 18, 1969

3,433,589
METHOD OF PREPARING FAUJASITE-TYPE CRYSTALLINE ZEOLITES
Julius Ciric, Pitman, and Luther J. Reid, Jr., Audubon, N.J., assignors to Mobil Oil Corporation, a corporation of New York
No Drawing. Filed Apr. 7, 1966, Ser. No. 540,813
U.S. Cl. 23—113      12 Claims
Int. Cl. C01b 33/28

ABSTRACT OF THE DISCLOSURE

Preparing crystalline aluminosilicate material having a faujasitic crystal structure by preparing an initial reaction mixture of $M_2O$ wherein M is an alkali metal cation or a quaternary alkyl ammonium cation, alumina, silica and water and wherein the molar $M_2O/SiO_2$ ratio is above 0.7, heating this mixture at a temperature below 212° F. for a time less than 192 hours, adjusting the composition to form a second reaction mixture having a molar $M_2O/SiO_2$ ratio below 0.7 and digesting said mixture at a temperature below 300° F. until faujasitic type crystals form.

---

This invention relates to a method of preparing a synthetic crystalline zeolite. More particularly, this invention relates to a method of preparing a crystalline zeolite such as a crystalline aluminosilicate zeolite or a crystalline gallium germanate, which zeolite has the faujasitic type of crystal structure, and comprises preparing a faujasite crystal directing mixture of the following composition:

Mole ratio:
- $Na_2O/SiO_2$ _____ 0.7–6.0
- $SiO_2/Al_2O_3$ _____ 2–40
- $H_2O/Na_2O$ _____ 12–300

The foregoing mixture is subjected to mild thermal treatment, and then the composition of the mixture is adjusted so as to form a reaction mixture of the composition:

Mole ratio:
- $Na_2O/SiO_2$ _____ 0.3–0.7
- $SiO_2/Al_2O_3$ _____ 6–60
- $H_2O/Na_2O$ _____ 25–300

This reaction mixture is then digested whereby faujasitic crystal growth is effected.

A particularly advantageous aspect of this invention is that it enables one to prepare synthetic crystalline zeolite Y from virtually any reactive silica source. Heretofore zeolite Y has been prepared only from such silica sources as described in U.S. Patent 3,130,007.

Zeolitic materials, both natural and synthetic, have been demonstrated in the past to have catalytic capabilities for various types of hydrocarbon conversion. Included in the zeolitic materials are ordered crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra-containing aluminum is balanced by the inclusion in the crystal of a cation, for example, an alkali metal or an alkaline earth metal cation. This equilibrium can be expressed by formula wherein the ratio of $Al_2$ to the number of cations, such as Ca, Sr, $Na_2$, $K_2$ or $Li_2$, is equal to unity. One cation may be exchanged either in entirety or partially by another cation utilizing ion-exchange techniques. By means of such cation exchange, it is possible to vary the size of the pores in a given aluminosilicate by suitable selection of the particular cation. The spaces between the tetrahedra are occupied by molecules of water prior to dehydration. The parent zeolite is normally dehydrated to activate it for use as a catalyst.

A description of such zeolites is found in Patents 2,971,824 and 3,033,778, which descriptions are hereby incorporated herein by reference.

In their hydrated form, the aluminosilicates may be represented by the formula:

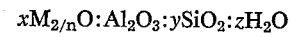
$$xM_{2/n}O:Al_2O_3:ySiO_2:zH_2O$$

wherein M is a cation which balances the electrovalence of the tetrahedra, n represents the valence of the cation, y the moles of $SiO_2$ and z the moles of $H_2O$, the removal of which produces the characteristic open network system and which activates the aluminosilicate for use as a catalyst.

One synthetic aluminosilicate to which the present invention relates and which possesses the crystal structure of faujasite is that of the Y series. Zeolite Y is described in the literature, e.g., U.S. Patent 3,130,007. Such zeolite has the following formula, expressed in oxide mole ratios:

$$0.9 \pm 0.2 Na_2O:Al_2O_3:ySiO_2:zH_2O$$

wherein y is a value ranging from 3 to 6 and z may be any value up to about 9.

Molecular sieves are ordinarily prepared initially in the sodium, potassium, or mixed sodium and potassium form of the crystal, the sodium ions in the resulting product being exchangeable for other cations as previously mentioned. In general, the process of preparation of such materials involves heating, in aqueous solution and under atmospheric pressure or less, an appropriate mixture of oxides or of materials whose chemical composition can be completely represented as a mixture of oxides $Na_2O$, $Al_2O_3$, $SiO_2$ and $H_2O$ at a temperature of approximately 21° C. to 150° C. and preferably 100° C. for periods of 15 minutes to 90 hours or more. The material which is first formed on mixing the reactants is an amorphous gel which, after the reaction has proceeded sufficiently, forms a crystalline product which may be separated therefrom and water washed until the water in equilibrium with the zeolite has a pH in the range of 9 to 12. The crystals are then dried at a temperature between 25° C. and 150° C. After activating by heating until dehydration is attained, e.g., at 350° C. and atmospheric pressure, the substance is ready for use.

The stability of the crystalline aluminosilicates in the presence of heat, steam and acid, as well as their catalytic properties in general, are to a great extent dependent upon the silica/alumina ratio in the crystal lattice of the aluminosilicate. Generally speaking, the higher the silica/alumina ratio in the aluminosilicate, the greater the stability to heat, steam and acid. In view of this fact, there are a variety of applications for which crystalline aluminosilicates having too low a silica/alumina ratio are inappropriate.

The present invention provides a novel method for synthesizing faujasite-type crystalline zeolites.

The present invention further provides a method for preparing faujasite-type crystalline zeolites such as aluminosilicate zeolites and gallium germanate zeolites.

The present invention additionally provides a method of preparing faujasite-type crystalline zeolites in good yield without simultaneously also producing appreciable quantities of different species of zeolites.

The zeolites having a faujasitic type of crystal structure that may be prepared by the method of this invention generally may be characterized by the general formula $$xM_2O:X_2O_3:yYO_2:zH_2O$$

where M is a cation such as sodium, potassium, cesium, rubidium, lithium, or quaternary alkyl ammonium wherein the alkyl contains from about 1 to 4 carbon atoms, and preferably is sodium; $x$ is about $0.9\pm0.2$; X is aluminum or gallium, and preferably is aluminum; Y is silicon or germanium, and preferably is silicon; $y$ is at least about 3.0 and generally is from about 3.0 to 6.0; and $z$ does not exceed about 9.

Crystalline aluminosilicates which are most advantageously prepared by the novel process of the present invention are those having a faujasitic crystal structure, the general formula for which may be represented as follows in terms of moles of oxides:

$$xM_2O:Al_2O_3:ySiO_2:zH_2O$$

wherein M is a cation such as sodium or quaternary alkyl ammonium wherein the alkyl contains from about 1 to 4 carbon atoms; $x$ is about $0.9\pm0.2$; $y$ is at least about 3.0; and $z$ is up to about 9. The process of the present invention is particularly suited for making crystalline aluminosilicates having the above general formula but in which $y$ is at least 4.5.

In accordance with one aspect of this invention, a hydrogel, e.g. a silica-alumina hydrogel, is prepared as one component for a reaction mixture, which reaction mixture is made up of said hydrogel and of a hydroxide such as sodium hydroxide. The final proportions of the reaction mixture are such that the reaction mixture ordinarily would not be capable of undergoing crystallization to produce faujastic type crystals. However, according to this invention a portion, e.g., from about 5 to 40 percent by weight of the total amount of hydrogel, is added to the hydroxide to thereby form a "faujasite crystal directing" (FCD) mixture. This FCD mixture is then heated, e.g. at about 50° C. for about 2½ hours. Thereafter, the remainder of the hydrogel is added to the FCD mixture to form the total reaction mixture and the whole is digested, e.g. at 100° C. for ½ to 14 days, to effect faujasitic type crystal growth. The resultant faujastite type crystals are then filtered and dried.

While we are not certain of the reaction mechanism that occurs, it appears that thermal treatment of the faujasite crystal directing (FCD) mixture results in the formation of faujasite "nuclei," although the presence of such "nuclei" can not be detected by methods of analysis. It is presumed that these invisible nuclei direct the growth of the initially amorphous reaction mixture so as to form faujasite crystals.

Where it is desired to prepare a gallium germanate zeolite of faujasitic type crystallinity, then there is employed a germania-gallia hydrogel rather than a silica-alumina hydrogel.

The method of the present invention is advantageous in that it permits the use of "unwashed" hydrogel. For example, when a silica-alumina hydrogel is employed in the practice of this invention, it may also contain sodium sulfate (from the reaction of aluminum sulfate and sodium silicate).

Additionally, the method of this invention is advantageous in that starting materials other than hydrogels may be employed. Thus, satisfactory results are obtained when the same reactants are used without first forming a hydrogel. For instance, sodium silicate may be added to sodium hydroxide followed by the addition of acid aluminum sulfate to thereby form the FCD mixture. Following mild heat treatment of the FCD mixture, additional sodium silicate and acid aluminum sulfate may be added to form the total reaction mixture.

The constituency of the faujasite crystal directing (FCD) mixture should be approximately as follows (expressed as oxide mole ratios):

$Na_2O/SiO_2$ _____ 0.7–6.0
$SiO_2/Al_2O_3$ _____ 2–40
$H_2O/Na_2O$ _____ 12–300

A preferred composition for the FCD mixture is:

$Na_2O/SiO_2$ _____ 1.0–3.0
$SiO_2/Al_2O_3$ _____ 9–30
$H_2O/Na_2O$ _____ 15–40

A particularly preferred FCD composition is:

$Na_2O/SiO_2$ _____ 1.8
$SiO_2/Al_2O_3$ _____ 16
$H_2O/Na_2O$ _____ 18–25

The FCD mixture is characterized by a highly alkaline pH, generally at least 12.5.

The conditions of thermal treatment of the FCD mixture vary depending upon the particular composition of the mixture. The temperature of heating will be from about room temperature up to 212° F., with the time of heating being of the order of a few minutes at 212° F. to several days at ambient temperature. In general, the lower the $Na_2/SiO_2$ ratio or the higher the $H_2O/Na_2O$ ratio, the longer the FCD mixture must be maintained at the particular heating temperature employed.

As noted, the higher the temperature, the less time required for the heating. Generally, the time required will be from about 1 minute to 96 hours. Indeed, at the lowest $Na_2O/SiO_2$ ratio and highest $H_2O/Na_2O$ ratio, the heating at ambient temperature could be continued for several days. A more preferred time range is from about 15 minutes to about 6 hours.

Following the heating of the FCD mixture, additional ingredients are added thereto with agitation to form the total (faujasite-crystal-forming) reaction mixture. The constituency of the reaction mixture is desirably as follows (expressed as oxide mole ratios):

$Na_2O/SiO_2$ _____ 0.3–0.7
$SiO_2/Al_2O_3$ _____ 6–60
$H_2O/Na_2O$ _____ 25–300

For most effective results, the constituency of the reaction mixture should be:

$Na_2O/SiO_2$ _____ 0.34–0.5
$SiO_2/Al_2O_3$ _____ 12–22
$H_2O/Na_2O$ _____ 60–300

The most preferred composition of the reaction mixture should be:

Na$_2$O/SiO$_2$ _____ 0.38
SiO$_2$/Al$_2$O$_3$ _____ 16
H$_2$O/Na$_2$O _____ 100

It has been found that neither the quality of the crystals nor the crystal yield is sensitive to the water content of the reaction mixture, provided that the molar ratio of H$_2$O to Na$_2$O be from about 25:1 to 300:1.

The reaction mixture is alkaline, desirably having a pH below about 12.5. Such alkaline pH condition has been found to favor the growth of faujasite type crystals, particularly high silica faujasite.

The reaction mixture is digested by heating under such conditions of temperature and time as to effect faujasite-type crystal growth on the nuclei. The temperature at which the digestion is carried out may be from about 25 to 300° F., more desirably is from about 160 to 225° F., and most preferably is from about 180 to 212° F. The heating time is from about 4 hours to 60 days, the longer times being required for reaction mixtures of low Na$_2$SiO$_2$ ratio at the most preferred reaction conditions. More desirably the time is from about 12 to 72 hours, and most preferably from about 24 to 60 hours. Of course, the higher the temperature, the less the time required at such temperature to effect complete crystallization.

After crystallization has been effected the crystals are washed, filtered and then dried, e.g., at a temperature of from about 70 to 300° C. to a residual moisture content not greater than about 35 percent by weight.

The method of this invention permits the obtaining of faujasitic type crystals with very high yield, approaching the theoretical. Moreover, the faujasitic type crystals contain little or no impurities arising from the presence of other crystalline species such as, e.g., zeolite S and zeolite B.

The crystalline synthetic faujasitic type zeolites produced in accordance with the present invention may, if desired, be ion exchanged with cations from Groups I–VIII of the Periodic Table and then be activated, as by heating at 600° F. and atmospheric pressure, to effect dehydration. The resulting catalysts are then most suitable for use, either alone or dispersed in a porous inorganic oxide matrix, in the catalytic conversion of hydrocarbons, e.g., as in cracking, hydrocracking, alkylation, isomerization, hydrogenation, dehydrogenation, dehydrohalogenation, and the like.

The following examples will further illustrate our invention. All parts are by weight unless otherwise stated.

EXAMPLE 1

A hydrogel was prepared as follows. A sodium silicate solution and an acid-aluminum sulfate solution were prepared. The sodium silicate solution was prepared by mixing 53.0 weight percent "Q" brand sodium silicate (8.9 weight percent Na$_2$O, 28.7 weight percent SiO$_2$, and 62.4 weight percent water; specific gravity at 60° F.=1.395), 4.8 weight percent of 50% sodium hydroxide solution (specific gravity at 70° F.=1.525), and 42.2 weight percent water. The resulting sodium silicate solution had a specific gravity at 70° F. of 1.217. The acid-aluminum sulfate solution was prepared by mixing 4.5 weight percent of sulfuric acid (98%), 11.0 weight percent of Al$_2$(SO$_4$)$_3$·14H$_2$O, and 84.5 weight percent water. The resulting acid-aluminum sulfate solution had a specific gravity at 80° F. of 1.094.

The sodium silicate solution and acid-aluminum sulfate solution were mixed in a nozzle to form a thoroughly mixed hydrosol which set to a gel in about one second. The respective flow rates were 595 grams per minute of sodium silicate solution and 495 grams per minute of acid-aluminum sulfate solution. The pH of the resulting hydrogel was 9.0. The composition of the unwashed hydrogel was (molar ratios):

1.45Na$_2$O·Al$_2$O$_3$·3.5SiO$_2$·5.4Na$_2$SO$_4$·550H$_2$O

Twenty grams of solid sodium hydroxide pellets were mixed with 100 grams of the foregoing hydrogel to form the faujasite crystal directing (FCD) mixture. The mixing was carried out in a bottle immersed in a thermostatic bath kept at 50° C. The resulting clear solution was kept in the bath for two hours. It was then mixed in a Waring Blendor for 15 minutes with 400 grams of remaining hydrogel to form the total reaction mixture. The mixture was put in a stoppered bottle and placed in a steam bath kept at 100 C. After 2½ days, the resulting crystals were washed, filtered and dried. X-ray analysis showed the resulting crystals to be faujasite. (Composition, on a molar basis=Na$_2$O·Al$_2$O$_3$·4.5SiO$_2$.) The crystal sizes were from about 0.1 to 1 micron.

The crystallinity was 85%, and the adsorption capacity was 20.0%. (The conditions under which the sorption of cyclohexane and water were determined both above and elsewhere in this specification were as follows: a weighed sample is contacted with the desired pure adsorbate vapor in an adsorption chamber at a pressure less than the vapor-liquid equilibrium pressure of the adsorbate at room temperature. This pressure is kept constant (20 mm. with cyclohexane; 12 mm. with water) during the adsorption period. Adsorption is complete when constant pressure is reached. The increase in weight is calculated as the adsorption capacity of the sample. "Crystallinity" as used in this specification is determined by comparison with a commercial 13X aluminosilicate as 100% crystalline.)

EXAMPLE 2

This example served as a "control." The procedure of Example 1 was followed, however the preliminary heating for two hours at 50° C. was omitted. The final product was amorphous, as compared to the crystalline product of Example 1.

EXAMPLE 3

The procedure was similar to Example 1, however the digestion time for the FCD mixture was 30 minutes rather than two hours. X-ray analysis showed the resulting crystals to be faujasite (Na$_2$O·Al$_2$O$_3$·4.5SiO$_2$). The crystallinity was 65%. The cyclohexane adsorption capacity was 19.8%. Crystal particle size was from about 0.1 to 2 microns.

EXAMPLE 4

The procedure was similar to Example 1, except that the digestion time for the FCD mixture was one half hour. X-ray analysis showed the resulting crystals to be faujasite (Na$_2$O·Al$_2$O$_3$·4.5SiO$_2$). The crystallinity was 85%. The cyclohexane adsorption capacity was 19.8%. Crystal particle size was about 1 micron or less.

EXAMPLE 5

The procedure was similar to Example 1, however in this instance the FCD mixture consisted of 20 grams of sodium hydroxide and 150 grams of hydrogel. The digestion time for the FCD mixture was 2 hours at 50° C. The FCD mixture was then mixed in a Waring Blendor for 10 minutes with 350 grams of remaining hydrogel to form the total reaction mixture. This was maintained at 100° C. for 2½ days. X-ray analysis showed the resulting crystals to be faujasite (Na$_2$O·Al$_2$O$_3$·4SiO$_2$). The crystallinity was 75%. The cyclohexane adsorption capacity was 19.9%. Crystal particle size was from about 2 to 3 mircons.

EXAMPLES 6–10

In each of these examples the procedure was similar to that described in Example 1, but with certain variations in conditions as set forth in Table 1. The results are reported in Table 1.

A consideration of Table 1 shows that in each of the examples there resulted faujasite crystals.

TABLE 1.—SYNTHESIS OF FAUJASITE FROM UNWASHED SILICA-ALUMINA HYDROGEL

| Ex. | Preparation of faujasite crystal directing (FCD) mixture | | | | Preparation of reaction mixture | | Calculated reaction mixture composition, mole ratios | | | | Product resulting from digestion |
|---|---|---|---|---|---|---|---|---|---|---|---|
| | Weight percent hydrogel[1] used in FCD mixture | Grams of hydrogel[1] used in FCD mixture | Grams of 50% NaOH solution used for FCD mixture | Thermal treatment conditions for FCD mixture[2] (Usually no agitation) | Grams of hydrogel[1] mixed with FCD mixture | Digestion of reaction mixture | $Na_2O/SiO_2$ | $SiO_2/Al_2O_3$ | $H_2O/Na_2O$ | $Na_2SO_4/Al_2O_3$ | |
| 6 | 20 | 231.4 | 92 | 24 hrs. at 75° F. | 925.0 | 3 days at 195° F. | 0.4 | 16.3 | 88 | 5.4 | Faujasite ($Na_2O \cdot Al_2O_3 \cdot 5.5SiO_2$); 75% cryst. |
| 7 | 20 | 210.5 | 84.3 | 2 hrs. at 122° F. | 841.9 | 2⅔ days at 195° F. | 0.4 | 16.3 | 88 | 5.4 | Faujasite ($Na_2O \cdot Al_2O_3 \cdot 4SiO_2$); 75% cryst. |
| 8 | 30 | 340.0 | 90.0 | ----do------ | 786.0 | ----do------ | 0.4 | 16.3 | 88 | 5.4 | Faujasite ($Na_2O \cdot Al_2O_3 \cdot 4.5SiO_2$); 80% cryst. |
| 9 | 20 | 216.3 | 86.5 | 2 hrs. at 122° F. while stirring. | 865.0 | ----do------ | 0.4 | 16.3 | 88 | 5.4 | Faujasite ($Na_2O \cdot Al_2O_3 \cdot 4SiO_2$); 80% cryst. |
| 10 | 20 | 192.6 | 77 | 4 hrs. at 75° F. | 770.4 | 4 days at 195° F. no stirring. | 0.4 | 16.3 | 88 | 5.4 | Faujasite ($Na_2O \cdot Al_2O_3 \cdot 5SiO_2$); 70% cryst. |

[1] Hydrogel composition, mole ratios, $1.45Na_2O \cdot Al_2O_3 \cdot 16.3SiO_2 \cdot 5.4Na_2SO_4 \cdot 550H_2O$; gel mixed well with its syneresis water before using. Composition includes syneresis water.

[2] Frequently an amorphous precipitate forms before or during this thermal treatment step.

EXAMPLE 11

Hydrosol was prepared as described in Example 1. A 100 gram portion of the hydrosol from the nozzle was immediately (i.e., prior to setting to hydrogel) mixed with 20 grams of sodium hydroxide (Example 1) to form the FCD mixture. The mixing was carried out in a bottle immersed in a thermostatic bath at 50° C. The resulting clear solution was kept in the bath for two hours.

The total reaction mixture was then formed by mixing the foregoing soluton in a Waring Blendor for 15 minutes with 400 grams of the hydrogel which had set from the remainder of the hydrosol. The whole was put in a stoppered bottle and placed in a steam bath maintained at 100° C. After 2½ days the resulting crystals were washed, filtered, and dried. X-ray analysis showed them to be faujasite. (Composition=$Na_2O \cdot Al_2O_3 \cdot 4.5SiO_2$.) The crystal size ranged from about 0.1 to 1 micron. The crystallinity was 85% and the adsorption capacity was 20%.

The foregoing description and examples are illustrative of the present invention, but variations therein may, of course, be made without departing from the spirit of this invention.

Having thus described the invention, what is desired to be secured and claimed by Letters Patent is:

1. A method of preparing a crystalline material having a faujasitic crystal structure and characterized by the general formula $$xNa_2O : Al_2O_3 : ySiO_2 : zH_2O$$

wherein $x$ is about $0.9 \pm 0.2$, $y$ is from about 3.0 to 6.0, and $z$ does not exceed about 9, comprising preparing a faujasite crystal directing mixture having a $Na_2O/SiO_2$ molar ratio of from about 0.7 to 6.0, a $SiO_2/Al_2O_3$ molar ratio of from about 2 to 40, and a $H_2O/Na_2O$ molar ratio of from about 12 to 300, heating said mixture at a temperature of from about 212 to 70° F. for a time of from about 1 minute to 192 hours, adjusting the constituency of said mixture to form a faujasite crystal forming reaction mixture having a $Na_2O/SiO_2$ molar ratio of from about 0.3 to 0.7, a $SiO_2/Al_2O_3$ molar ratio of from about 6 to 60, and a $H_2O/Na_2O$ molar ratio of from about 25 to 300, and digesting said reaction mixture at a temperature of from about 25 to 300° F. for a time of from about 4 hours to 60 days to thereby grow faujasitic crystals.

2. The method of claim 1 wherein said faujasite crystal directing mixture is prepared by reacting solutions of sodium silicate, aluminum sulfate, and an inorganic acid to form a hydrosol, permitting the hydrosol to set to a silica-alumina hydrogel, and adding sodium hydroxide thereto.

3. The method of claim 1 wherein said faujasite crystal directing mixture is prepared by reacting solutions of sodium silicate, aluminum sulfate, and an inorganic acid to form a hydrosol, permitting the hydrosol to set to a silica-alumina hydrogel, and adding sodium hydroxide to a portion of said hydrogel to thereby form said faujasite crystal directing mixture, and wherein said reaction mixture is formed by adding to said faujasite crystal directing mixture an additional amount of said hydrogel.

4. The method of claim 1 wherein said faujasite crystal directing mixture is prepared by reacting solutions of sodium silicate, aluminum sulfate, and an inorganic acid to form a hydrosol, and immediately adding to said hydrosol, prior to the setting thereof to hydrogel, sodium hydroxide.

5. The method of claim 1 wherein said faujasite crystal directing mixture is prepared by reacting solutions of sodium silicate, aluminum sulfate, and an inorganic acid to form a hydrosol, and immediately adding to a portion of said hydrosol, prior to the setting of such portion to hydrogel, sodium hydroxide to thereby form said faujasite crystal directing mixture, and wherein said reaction mixture is formed by adding to said faujasite crystal directing mixture hydrogel resulting from the setting of the remainder of said hydrosol.

6. The method of claim 1 wherein said faujasite crystals are washed, filtered, and dried.

7. The method of claim 1 wherein the pH of said faujasite precursor mixture is at least about 12.5.

8. The method of claim 1 wherein the pH of said reaction mixture is less than about 12.5.

9. The method of claim 1 wherein said faujasite crystal directing mixture is characterized by a $Na_2O/SiO_2$ molar ratio of from about 1.0 to 3.0, a $SiO_2/Al_2O_3$ molar ratio of from about 9 to 30, and a $H_2O/Na_2O$ molar ratio of from about 15 to 40, and wherein said reaction mixture is characterized by a $Na_2O/SiO_2$ molar ratio of from about 0.34 to 0.5, a $SiO_2/Al_2O_3$ molar ratio of from about 12 to 22, and a $H_2O/Na_2O$ molar ratio of from about 60 to 300.

10. The method of claim 1 wherein said faujasite crystal directing mixture is characterized by a $Na_2O/SiO_2$ molar ratio of about 1.8, a $SiO_2/Al_2O_3$ molar ratio of about 16, and a $H_2O/Na_2O$ molar ratio of from about 18 to 25, and wherein said reaction mixture is characterized by a $Na_2O/SiO_2$ molar ratio of about 0.38, a $SiO_2/Al_2O_3$ molar ratio of about 16, and a $H_2O/Na_2O$ molar ratio of about 100.

11. In the method of preparing a crystalline aluminosilicate having a faujasitic crystal structure from a reaction mixture of an alkali metal oxide $M_2O$, alumina, silica, and water, the improvement which comprises preparing said reaction mixture with a molar $M_2O/SiO_2$ ratio above 0.7, heating said mixture at a temperature of from about 212 to 70° F. for a time from about 1 minute to 192 hours, adjusting the composition of said mixture to form a reaction mixture having a molar ratio of $M_2O/SiO_2$ below 0.7, and digesting said mixture at a temperature below 300° F. until faujasitic type crystals form.

12. In the method of preparing a crystalline aluminosilicate having a faujasitic crystal structure and characterized by the formula:

$$xM_2O:Al_2O_3:ySiO_2:zH_2O$$

wherein M is a cation selected from the group consisting of alkali metal and quaternary alkyl ammonium in which the alkyl group contains from about 1 to 4 carbon atoms; $x$ is $0.2\pm0.2$, $y$ is at least about 3.0 and $z$ is a number up to about 9, from a reaction mixture of $M_2O$, alumina, silica and water, the improvement which comprises preparing said reaction mixture having a molar $M_2O/SiO_2$ ratio above 0.7, maintaining said mixture at a temperature below 212° F. for a time of less than 192 hours to form a faujasite crystal directing mixture, adjusting the composition thereof to form a reaction mixture having a molar ratio of $M_2O/SiO_2$ below 0.7 and digesting said mixture at a temperature below about 300° F. until faujasitic type crystals form.

References Cited

UNITED STATES PATENTS

| | | | |
|---|---|---|---|
| 3,130,007 | 4/1964 | Breck | 23—113 |
| 3,321,272 | 5/1967 | Kerr | 23—113 |
| 3,343,913 | 9/1967 | Robson | 23—113 |

EDWARD J. MEROS, *Primary Examiner.*